Nov. 17, 1953  W. KÖNIG  2,659,764
FURNACE AND PROCESS FOR ELECTRICALLY MELTING GLASS
Filed Jan. 29, 1951  2 Sheets-Sheet 1

INVENTOR.
BY  Walther König

Nov. 17, 1953 W. KÖNIG 2,659,764
FURNACE AND PROCESS FOR ELECTRICALLY MELTING GLASS
Filed Jan. 29, 1951 2 Sheets-Sheet 2

INVENTOR.
Walther König
BY

Patented Nov. 17, 1953

2,659,764

UNITED STATES PATENT OFFICE 2,659,764

FURNACE AND PROCESS FOR ELECTRICALLY MELTING GLASS

Walther König, Vienna, Austria, assignor to Mitterberger Glashuetten Gesellschaft m. b. H., Salzburg, Austria, a corporation of Austria Application January 29, 1951, Serial No. 208,306

Claims priority, application Austria January 28, 1950

10 Claims. (Cl. 13—6)

This invention relates to a method and furnace for electrically melting glass in an oblong tank fitted with electrodes connected to a suitable source of electric current, the heat developed by the Joule effect of the electric current flowing between the electrodes being utilized for melting the glass into which said electrodes project, which glass constitutes an electric resistance, so that a pure resistance heating is achieved.

In such furnaces the heat requirement of the melt substantially consists of three components:

The first component consists of the amount of heat required for heating the cold charge to its melting temperature, and of the heat of decomposition of the carbonate raw materials. The second component consists of the amount of the heat lost through the tank bottom and the furnace arch. These two components of the heat requirement add up to a heat requirement which is much higher in the center of the tank than at its sides.

The third component of the heat requirement is the amount of heat lost through the side walls of the tank. Since for several years only electrically molten and cast lining bricks, which are of very high thermal conductivity, which is much higher than that of lining bricks made from burnt fire-clay, have been used in furnaces, of the type described, this third heat requirement is of substantial magnitude.

As a result of the heat loss taking place through the side walls, a narrow marginal region of much colder glass is formed in the tank and frequently leads to defects in the finished product.

It is an object of this invention to provide a furnace of the type specified which comprises means for satisfying also this third heat requirement, in addition to the first and second ones, and a method of operating this furnace.

The main feature of this invention resides in that the furnace comprises, in addition to the main electrodes which are arranged in the manner known, shorter auxiliary electrodes one of which is provided opposite each main electrode on the other longitudinal side wall of the furnace, and connected to the same pole or phase of the source of current.

Figure 1:
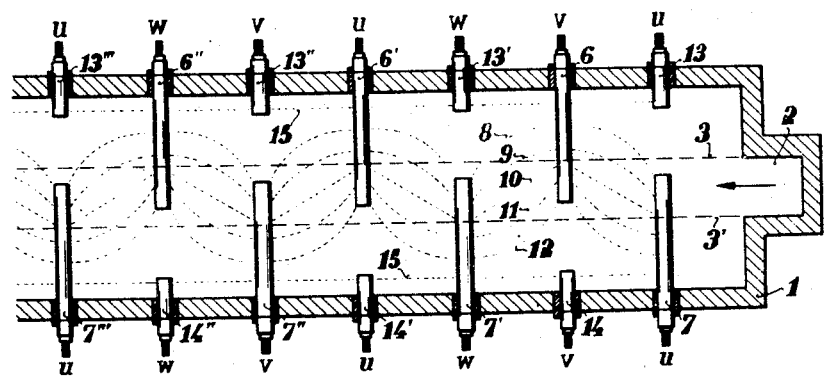
Figure 2:
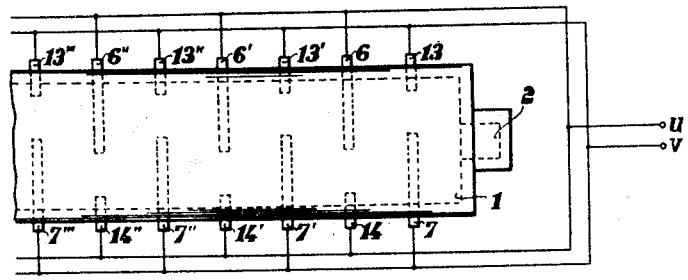
Figure 3:
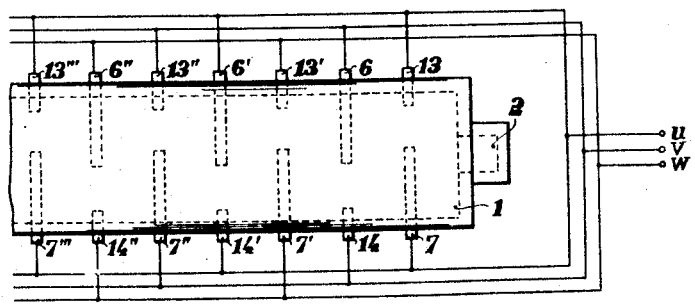
Figure 4:
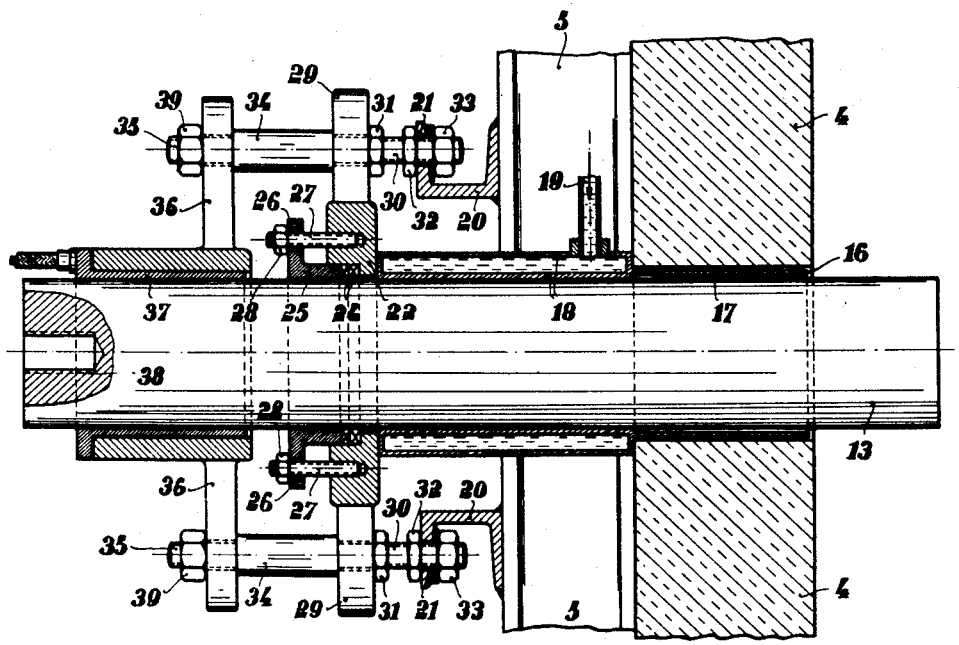
Figure 5:
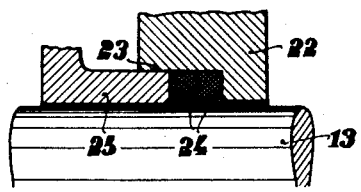

The invention will now be explained in detail with reference to the accompanying drawings in which, Figure 1 is a diagrammatic horizontal section showing a furnace embodying this invention, Figures 2 and 3 are wiring diagrams illustrating the electrical connection of the electrodes to sources of single-phase and polyphase electric current, respectively, Figure 4 is an enlarged sectional view showing an auxiliary electrode in conjunction with an example of a structure for slidably fitting said electrode adjacent to the tank wall, and Figure 5 is an enlarged view of a detail of Fig. 4.

Numeral 1 designates a rectangular tank, 2 the inlet spout through which the charge is fed into the tank, which charge subsequently travels through the tank in the direction of the arrow, to be transformed into homogeneous, well refined glass, which is ready for further processing. The charge can be fed into the tank continuously or in short intervals. However, the method of feeding is of no significance for the invention because in any case the mixture of raw materials slowly travels in the tank to the working end. In the tank, the charge is first heated from the room temperature at which it was fed, to the melting temperature. The raw charge travels approximately between the dash lines 3, 3' from the inlet spout toward the working end of the tank. At the same time the decomposition of sodium carbonate, limestone, and dolomite takes place, which also consumes a considerable amount of heat. Subsequently the glass forms, which is then purified and refined.

At each of the two longitudinal side walls of the furnace, main electrodes are provided, which extend toward the opposite side wall only a small distance beyond the center of the tank. The main electrodes of the right-hand wall (in respect of the direction of travel of the charge) are designated with 6, 6', and 6'', the main electrodes of the left-hand wall with 7, 7', 7'', and 7'''. These sets of main electrodes, being similar to a comb, are staggered from each other by half a pitch. They are connected to the source of electric current in such a manner that two adjacent electrodes, in respect of the longitudinal direction of the tank, are in each case connected to different poles or phases.

Where single-phase current is used for generating the heat, all main electrodes on one side wall are connected to one pole, and those on the other side wall to the other pole (Fig. 2).

Where polyphase current is used, the successive main electrodes, in respect of the longitudinal direction of the tank, are alternatingly connected to the several phases, e. g., the electrode 7 to phase $u$, electrode 6 to $v$, electrode 7' to $w$, electrode 6' again to $u$, electrode 7'' again to $v$, electrode 6'' again to $w$, and so forth (Figure 3).

Hence, from Figures 2 and 3 it is seen that the main electrodes are connected to a source of electric current which comprises a plurality of terminals which are electrically different in that they are associated with different poles or phases. The diagrammatically shown source of current is not in itself a subject of the invention and may consist e. g., of terminals associated with the secondary winding ends of a suitable transformer, which may be mounted adjacent to the furnace or separately thereof.

The flow of current between the electrodes connected to a source of single phase or polyphase current as has been described hereinbefore, is indicated by the flow lines 8 to 12. It can be seen that the flow lines extend in a zig-zag pattern across the tank so that more heat is generated in the central portion of the tank than at its sides. This distribution corresponds to the first and second components of the heat requirement.

For satisfying the third component of the heat requirement, an auxiliary electrode 13, 13', etc., and 14, 14', etc., respectively, is provided opposite each main electrode, and connected to the same terminal of the source of current as the latter. These auxiliary electrodes do not extend to the center of the tank but project inwardly only to that extent which is required to generate the amount of heat required to compensate the cooling effect of the sidewall bricks, as will be explained hereinafter. Thus, in addition to the flow lines 8 to 12, flow lines 15 are set up between each main electrode and the adjacent side electrodes so that the heat loss through the side walls is compensated.

In the example shown in Figures 4 and 5, the lining brick 4 has a bore 16, which is of slightly larger diameter than the slidable auxiliary electrode 13. Numeral 5 designates the supporting frame, which consists of I- or channel-section members. A cylindrical cooling sleeve 17 surrounds the auxiliary electrode 13 in the annular space between said electrode and the lining brick 4. This cooling sleeve is welded to a cylindrical cooling jacket 18, which communicates with a water supply line 19 and a drainpipe (not shown). The supporting frame 5 has welded to it a channel section cross beam 20, the outside flange of which is apertured at 21. A carrying ring 22, having an internal annular step 23, is passed on the electrode 13 and adjoins the outside end of the cooling jacket 18. Two gaskets 24, of asbestos cord, are inserted into said step and subjected to pressure by means of a clamping ring 25. The flange 26 of the clamping ring 25 is provided with a number of bores through which screw bolts 27 can be stuck, which are screwed, with their end which faces the lining brick, into the corresponding threaded bores of the carrying ring 22. The clamping ring 25 is forced against the carrying ring by means of screw nuts 28, whereby the gaskets 24 are compressed axially and urged radially against the electrode 13. The flange 29 of the carrying ring 22 has a bore for a screw bolt 30, which carries nuts 31, 32 and which extends through the bore 21 of the outside flange of the cross beam 20. The inside end of the screw bolt 30 has screwed to it a screw nut 33. In this manner the carrying ring 22 is connected to the cross-beam 20.

Outside the flange 29, the screw bolt 30 has a collar 34, from which its threaded outside end portion 35 is offset again. The screw bolt 30 extends through a bore in the flange 36 of a contact sleeve 37, which is passed on the electrode 13. Preferably the electrode 13 has a female screw thread 38 at its outside end, to provide a screw connection for a second electrode when the electrode has burnt off too much.

The flange 36 of the contact sleeve is forced against the collar 34 of the bolt 30, by means of a nut 39, whereby the flange 36 is firmly connected to the bolt. The supply lead for the electrode, shown diagrammatically in Figures 2 and 3, is fixed to the contact sleeve 37.

Before the operation of the furnace begins, the auxiliary electrode 13 is pushed inwardly through the wall only so far that it protrudes into the interior of the tank only to a small extent because, in the example shown, it can be pushed farther inwardly but cannot be retracted. When it is found during the operation of the furnace that the electrode must project farther into the pool of glass, the supply of water to the cooling jacket 18 is interrupted so that the cooling sleeve 17 loses its cooling effect. The glass which has accumulated in the annular space between the electrode 13 and the lining brick 4, and which during normal operation of the furnace solidifies under the influence of the cooling sleeve 17, liquefies as soon as the water supply to the cooling jacket 18 is interrupted and now the electrode 13 can be pushed farther into the furnace. Then water is again admitted to the jacket 18 and the operation of the furnace can be continued.

It is understood that the means described hereinbefore and shown in Figures 4 and 5 of the drawings, for cooling the electrodes, for slidably fitting the electrodes adjacent to the respective side wall of the tank, and for electrically contacting the electrode, do not constitute in themselves a subject of this invention but may be replaced by any other suitable means. E. g., where it is desired that the electrodes be also retractable, an adjusting arrangement as described and shown in the U. S. Patent No. 2,350,734 may be employed.

The extent to which the auxiliary electrode 13 should project into the tank interior depends only to a very slight degree on the internal width of the tank because the function of the electrode consists in heating the marginal region of the tank. When the said extent is less than about 8 inches, the required flow lines cannot form, whereas they are situated too far from the wall when said extent is more than about 20 inches.

The heating of the marginal portion of the tank can be controlled by the sliding adjustment of the auxiliary electrodes.

In large tanks requiring a large amount of heat, the low voltage which must be used for reasons of the safety of the operators, may necessitate the use of very thick electrodes to achieve the high amperage required. Owing to their large diameter these electrodes may constitute a barrier to the flow of glass. In such cases it may be of advantage to replace each excessively thick electrode by two thinner ones, which are arranged in close proximity of each other and connected to the same pole or phase, forming a single electrode only as far as their electrical function is concerned.

What I claim is:

1. A furnace for electrically melting glass which comprises an oblong tank having longitudinal side walls, main electrodes extending from each longitudinal side wall across the tank, the main electrodes of one side wall being staggered from those of the other in the longitudinal direction of the tank, an auxiliary electrode provided opposite each main electrode in the opposite side wall and projecting into the tank a lesser distance than the main electrode, a source of electric current having a plurality of electrically different terminals, and means for electrically connecting each main electrode and the opposite auxiliary electrode to one of said terminals, with the electrodes on either side of a given electrode being connected to a different terminal than the given electrode, in respect of the longitudinal direction of the tank.

2. A furnace for electrically melting glass, which comprises an oblong tank having longitudinal side walls, main electrodes extending from each longitudinal side wall across the tank, the main electrodes of one side wall being staggered from those of the other in the longitudinal direction of the tank, an auxiliary electrode provided opposite each main electrode in the opposite side wall and projecting into the wall by between 8 and 20 inches and a lesser distance than the main electrode, a source of electric current having a plurality of electrically different terminals, and means for electrically connecting each main electrode and the opposite auxiliary electrode to one of said terminals, with the electrodes on either side of a given electrode being connected to a different terminal than the given electrode, in respect of the longitudinal direction of the tank.

3. A furnace for electrically melting glass which comprises an oblong tank having longitudinal side walls, main electrodes extending from each longitudinal side wall across the tank, the main electrodes of one side wall being staggered from those of the other in the longitudinal direction of the tank, an auxiliary electrode provided opposite each main electrode in the opposite side wall and projecting into the tank a lesser distance than the main electrode, means for slidably fitting each auxiliary electrode adjacent to the respective side wall, a source of electric current having a plurality of electrically different terminals, and means for electrically connecting each main electrode and the opposite auxiliary electrode to one of said terminals, with the electrodes on either side of a given electrode being connected to a different terminal than the given electrode in respect of the longitudinal direction of the tank.

4. A furnace for electrically melting glass which comprises an oblong tank having longitudinal side walls, main electrodes extending from each longitudinal side wall across the tank, the main electrodes of one side wall being staggered from those of the other in the longitudinal direction of the tank, an auxiliary electrode provided opposite each main electrode in the opposite side wall and projecting into the tank a lesser distance than the main electrode, a source of polyphase electric current, and means for electrically connecting each main electrode and the opposite auxiliary electrode to a phase, with the electrodes on either side of a given electrode being connected to a different phase than the given electrode, in respect of the longitudinal direction of the tank.

5. A furnace for electrically melting glass which comprises an oblong tank having longitudinal side walls, main electrodes extending from each longitudinal side wall across the tank, the main electrodes of one side wall being staggered from those of the other in the longitudinal direction of the tank, an auxiliary electrode provided opposite each main electrode in the opposite side wall and projecting into the tank a lesser distance than the main electrode, a source of single-phase electric current, and means for electrically connecting each pole of said source of electric current to the main electrodes on one side wall and to the opposite auxiliary electrodes.

6. In the process of electrically melting glass in a furnace which comprises an oblong tank having longitudinal side walls, main electrodes extending from each longitudinal side wall across the tank, the main electrodes of one side wall being staggered from those of the other in the longitudinal direction of the tank, and an auxiliary electrode provided opposite each main electrode in the opposite wall and projecting into the tank a lesser distance than the main electrode, the step of feeding electric current to each main electrode and to the opposite auxiliary electrode from a source-of-current terminal with the electrodes on either side of a given terminal being connected to a different terminal than the given terminal, in respect of the longitudinal direction of the tank.

7. In the process of electrically melting glass in a furnace which comprises an oblong tank having longitudinal side walls, main electrodes extending from each longitudinal side wall across the tank, the main electrodes of one side wall being staggered from those of the other in the longitudinal direction of the tank, and an auxiliary electrode provided opposite each main electrode in the opposite wall and projecting into the tank a lesser distance than the main electrode, the step of feeding to each main electrode and to the opposite auxiliary electrode a phase of polyphase electric current with the electrodes on either side of a given electrode being connected to a different phase than the given electrode, in respect of the longitudinal direction of the tank.

8. In the process of electrically melting glass in a furnace which comprises an oblong tank having longitudinal side walls, main electrodes extending from each longitudinal side wall across the tank, the main electrodes of one side wall being staggered from those of the other in the longitudinal direction of the tank, and an auxiliary electrode provided opposite each main electrode in the opposite wall and projecting into the tank a lesser distance than the main electrode, the step of feeding to said electrodes single-phase electric current from a source of current each pole of which is electrically connected to the main electrodes of one side wall and the opposite auxiliary electrodes.

9. In the process of electrically melting glass in a furnace which comprises an oblong tank having longitudinal side walls, main electrodes extending from each longitudinal side wall across the tank, the main electrodes of one side wall being staggered from those of the other in the longitudinal direction of the tank, an auxiliary electrode provided opposite each main electrode in the opposite wall and projecting into the tank a lesser distance than the main electrode, and means for slidably fitting each auxiliary electrode adjacent to the respective side wall, the steps of adjusting the length by which each auxiliary electrode projects into the tank to between 8 and 20 inches, and of feeding electric current to each main electrode and to the opposite auxiliary electrode from a source-of-current terminal with the electrodes on either side of a given electrode being connected to a different terminal than the given electrode, in respect of the longitudinal direction of the tank.

10. A furnace for electrically melting glass comprising a tank, main electrodes extending into the tank from opposite walls thereof with the electrodes of one wall being staggered with respect to the electrodes of the other wall, an auxiliary electrode provided in the opposite wall of the tank with each auxiliary electrode being opposite the main electrode in the opposite wall, the said auxiliary electrodes projecting into the tank a lesser distance than the main electrodes, a source of electric current having a plurality of electrically different terminals, and means for electrically connecting each main electrode and the opposite auxiliary electrode to one of said terminals with the electrodes on either side of a given electrode being connected to a different terminal than the given electrode in respect to the longitudinal direction of the tank.

WALTHER KÖNIG.

References Cited in the file of this patent

UNITED STATES PATENTS

| Number | Name | Date |
|---|---|---|
| 1,610,377 | Hitner | Dec. 14, 1926 |
| 2,350,734 | Dumarest | June 6, 1944 |
| 2,552,395 | Borel et al. | May 8, 1951 |

FOREIGN PATENTS

| Number | Country | Date |
|---|---|---|
| 28,536 | Great Britain | of 1910 |
| 247,120 | Switzerland | Nov. 17, 1947 |
| 489,207 | Great Britain | July 21, 1938 |
| 498,379 | Great Britain | Jan. 6, 1939 |
| 600,268 | Great Britain | Apr. 5, 1948 |